US012286887B2

(12) United States Patent
Morelli et al.

(10) Patent No.: US 12,286,887 B2
(45) Date of Patent: Apr. 29, 2025

(54) INTEGRATION OF GENERATORS IN AN AIR FLOW OF AN AIRCRAFT ENGINE

(71) Applicants: SAFRAN AIRCRAFT ENGINES, Paris (FR); SAFRAN TRANSMISSION SYSTEMS, Colombes (FR)

(72) Inventors: Boris Pierre Marcel Morelli, Moissy-Cramayel (FR); Matthieu Bruno François Foglia, Moissy-Cramayel (FR); Clément Raucoules, Moissy-Cramayel (FR); Jean-Pierre Serey, Moissy-Cramayel (FR)

(73) Assignees: SAFRAN AIRCRAFT ENGINES, Paris (FR); SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/705,309

(22) PCT Filed: Oct. 18, 2022

(86) PCT No.: PCT/FR2022/051969
§ 371 (c)(1),
(2) Date: Apr. 26, 2024

(87) PCT Pub. No.: WO2023/073305
PCT Pub. Date: May 4, 2023

(65) Prior Publication Data
US 2025/0003350 A1    Jan. 2, 2025

(30) Foreign Application Priority Data
Oct. 28, 2021    (FR) ...................... 2111502

(51) Int. Cl.
*F01D 15/10*    (2006.01)

(52) U.S. Cl.
CPC ........ *F01D 15/10* (2013.01); *F05D 2220/323* (2013.01); *F05D 2220/76* (2013.01)

(58) Field of Classification Search
CPC ............... F01D 15/10; F05D 2220/323; F05D 2220/76; F05D 2220/34; F05D 2240/12;
(Continued)

(56) References Cited

U.S. PATENT DOCUMENTS 5,867,979 A * 2/1999 Newton .................. F02C 3/113
                                                                310/90.5
8,424,800 B2 * 4/2013 Finney ................. B64D 41/007
                                                                244/58
(Continued)

FOREIGN PATENT DOCUMENTS

EP    1748170 A2    1/2007
EP    3312093 A1    4/2018
(Continued)

OTHER PUBLICATIONS

International Search Report for International Application No. PCT/FR2022/051969, issued Dec. 16, 2022 (6 pages).

*Primary Examiner* — Jesse S Bogue
(74) *Attorney, Agent, or Firm* — Bookoff McAndrews, PLLC

(57) ABSTRACT

Turbomachine including: a fan arranged along a longitudinal axis of the turbomachine, a primary duct able to channel a primary air flow from the fan through a compressor, a combustion chamber and a turbine of the turbomachine, an annular nacelle surrounding the fan so as to delimit a secondary duct able to channel a secondary air flow from the fan the temperature of which is less than that of the primary air flow of the fan, the secondary air flow extending around the primary air flow of the fan and, engine support arms arranged around the longitudinal axis between the annular nacelle and a hub which delimits the primary and secondary (Continued)

ducts characterized in that it also includes an electrical energy generation device mounted facing or so as to be able to be arranged facing one of the support arms.

20 Claims, 4 Drawing Sheets

(58) Field of Classification Search
CPC .. B64D 2221/00; B64D 29/00; B64D 41/007; F05B 2240/923; Y02T 50/60; F02C 7/00; F03D 9/32
See application file for complete search history.

(56) References Cited

U.S. PATENT DOCUMENTS

| | | | |
|---|---|---|---|
| 9,908,635 B2 * | 3/2018 | Snyder | F01D 13/00 |
| 10,240,477 B2 * | 3/2019 | Ettridge | F01D 15/10 |
| 11,149,578 B2 * | 10/2021 | Joshi | F02C 6/00 |
| 2002/0152765 A1 | 10/2002 | Sauterleute et al. | |
| 2005/0138914 A1 | 6/2005 | Paul | |
| 2007/0022735 A1 * | 2/2007 | Henry | F02K 3/04 60/39.162 |
| 2013/0248657 A1 | 9/2013 | Riordan | |
| 2017/0321657 A1 | 11/2017 | Clemo | |
| 2020/0406775 A1 | 12/2020 | Siegmeth | |

FOREIGN PATENT DOCUMENTS

| | | |
|---|---|---|
| FR | 28242565 A1 | 1/2004 |
| FR | 3062972 A1 | 8/2018 |
| GB | 2285669 A | 7/1995 |
| GB | 2461057 A | 12/2009 |
| GB | 2471349 A | 12/2010 |
| WO | 2010078903 A2 | 7/2010 |
| WO | 2013129954 A1 | 9/2013 |

* cited by examiner

[Fig. 1A]
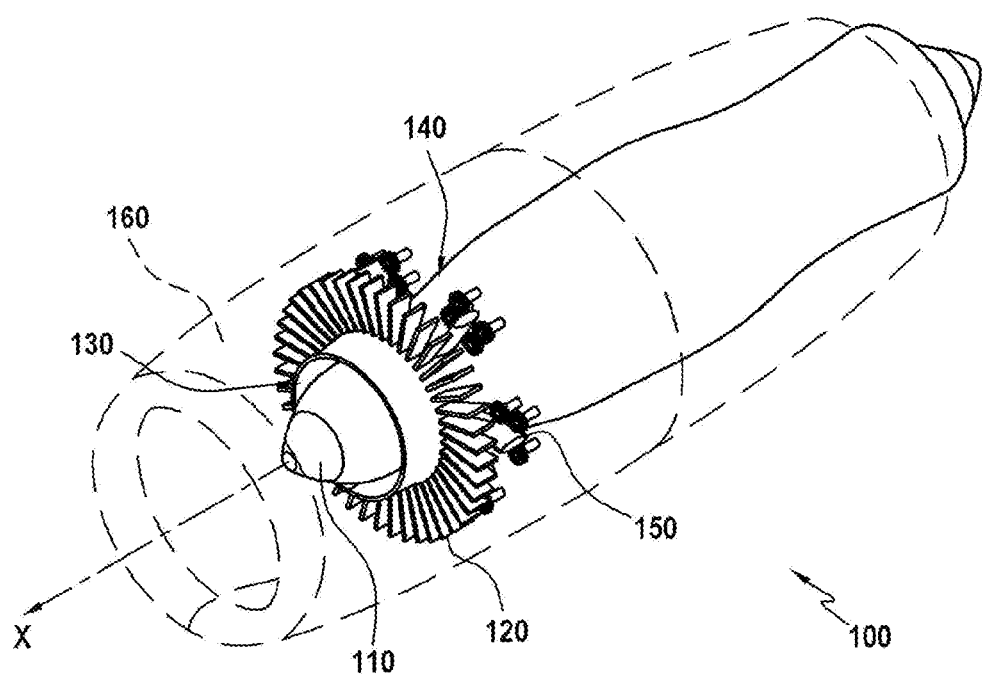
[Fig. 1B]
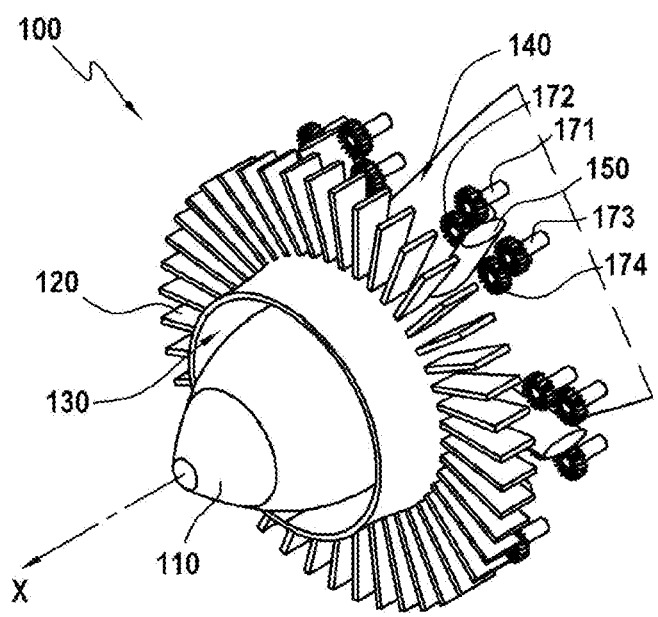

[Fig. 2]
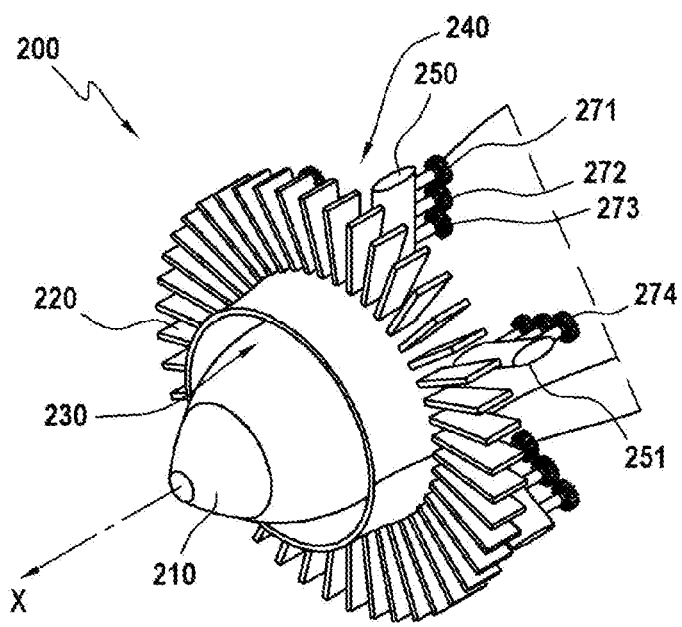
[Fig. 3A]
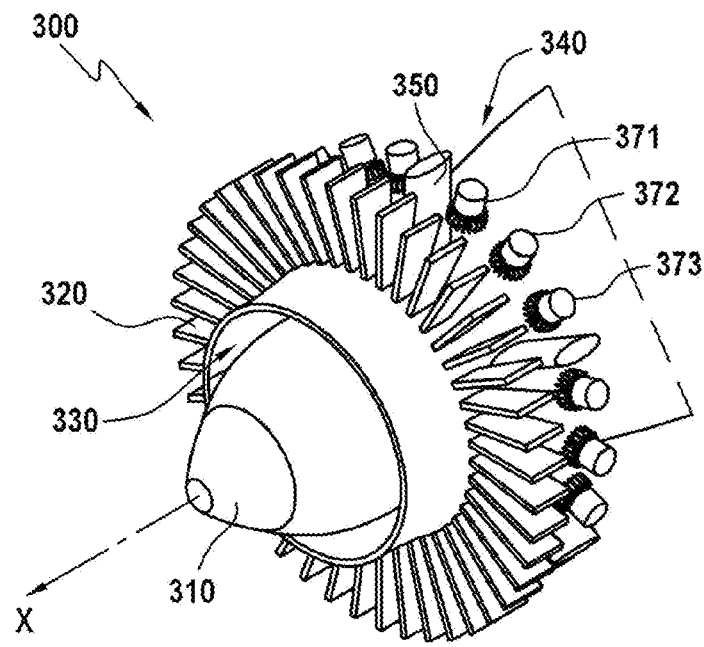

[Fig. 3B]
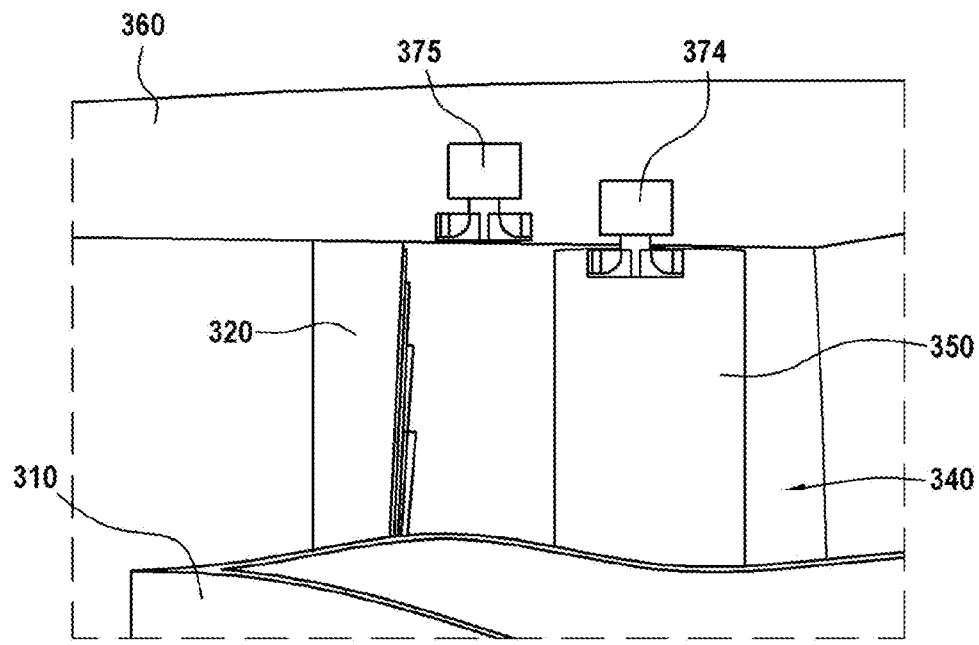
[Fig. 4A]
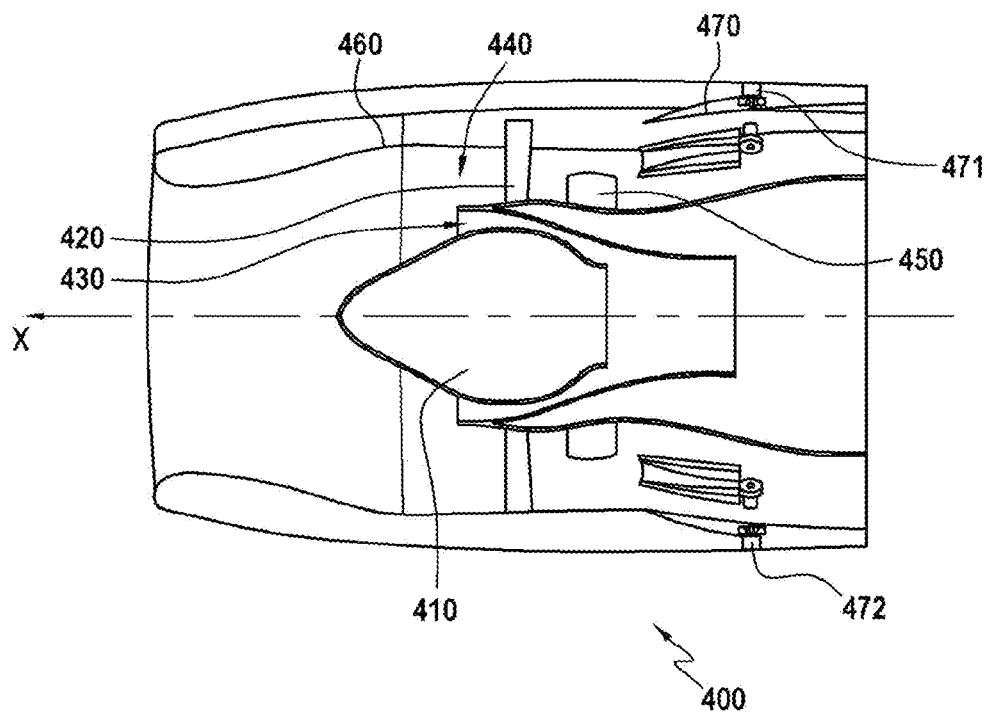

[Fig. 4B]
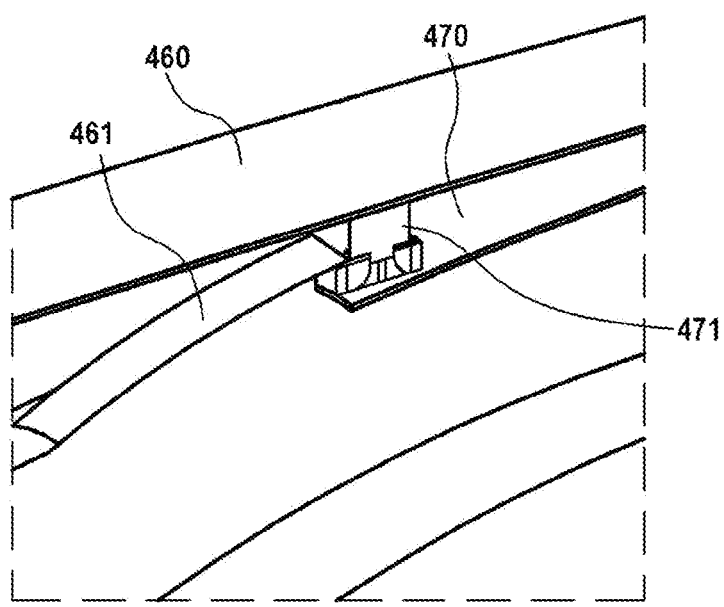

INTEGRATION OF GENERATORS IN AN AIR FLOW OF AN AIRCRAFT ENGINE

CROSS-REFERENCE TO RELATED APPLICATION(S)

This is a National Stage Application under 35 U.S.C. § 371 of International Application No. PCT/FR2022/051969, filed Oct. 18, 2022, which claims priority to French Patent Application No. 2111502, filed on Oct. 28, 2021.

TECHNICAL FIELD

The present invention relates to the general field of generating electrical energy in an aircraft and more particularly generating electrical energy using an air flow.

PRIOR ART

The need for electrical energy in airplanes is increasingly important and aircraft manufacturers require ever higher engine performance (electrical power supply, engine power, fuel consumption . . . ).

To be able to provide the electrical power supply of the airplane, certain airplanes have engines to which have been added one or more generators. However, the integration of these generators on the engine must be accomplished while minimizing the impacts on the performance of the engine, i.e. on the turbomachine.

Thus FR 2 842 565 and FR 3 062 972 propose the use of electrical generators coupled to an engine shaft or to the rotor of the compressor to produce electrical power. However, in the event of failure or shutdown of the engine, the production of this electrical power can be interrupted.

It is therefore desirable to have available a means of electrical energy production allowing guaranteeing the performance of the engine and being available even in the event of failure of the engine.

DISCLOSURE OF THE INVENTION

The invention relates to a turbomachine comprising:
a fan arranged along a longitudinal axis of the turbomachine,
primary duct able to channel a flow of primary air from the fan through a compressor, a combustion chamber and a turbine of the turbomachine,
an annular nacelle (160, 360, 460) surrounding the fan so as to delimit a secondary duct (140, 240, 340, 440) able to channel a flow of secondary air from the fan, the temperature of which is less than that of the primary air from the fan, the secondary air flow of the fan extending around the primary air flow of the fan, and
support arms (150, 250, 251, 350, 450) arranged around the longitudinal axis (X) between the annular nacelle and a hub which delimits the primary and secondary ducts,
characterized in that it also comprises an electrical energy generation device mounted facing or so as to be able to be arranged facing one of the support arms in the secondary air flow and driven by the secondary air flow.

Due to the invention, it is possible to generate electricity by means of the electrical energy generation device by using the available aerodynamic power.

Moreover, the electrical energy generation device is mounted and driven by the secondary air flow independently of the operation of the engine. This allows electrical generation even in the case of engine shutdown, as in the event of free rotation of the turbine of the engine ("windmilling").

In addition, the fact of being placed in the secondary air flow allows reducing the operational problems of installation of the electrical energy generation device, because the secondary air flow is colder than the primary flow, and the space allocated for its installation is greater in the secondary duct.

According to a particular feature of the invention, the turbomachine comprises a plurality of electrical energy generation devices mounted facing or so as to be able to be arranged facing the support arms in the secondary air flow and driven by the secondary air flow.

The fact of having a plurality of electrical energy generation devices also allows redundancy in the production of electricity, which is particularly useful in the event of failure of one of the devices.

According to another particular feature of the invention, the electrical energy generation devices are arranged in lines and/or in columns.

According to another particular feature of the invention, at least one of the electrical energy generation devices is mounted on a support arm.

This allows not impeding the flow of secondary air passing in the secondary duct.

According to one embodiment of the invention, at least one of the electrical energy generation devices is mounted on a support arranged around the longitudinal axis of the turbomachine between the support arms.

This allows the electrical energy generation devices to use the entire flow of air passing in the secondary duct.

According to a particular feature of the invention, at least one of the electrical energy generation devices mounted on the support arms or on a support arranged around the longitudinal axis of the turbomachine between the support arms is arranged facing the flow of secondary air or in the direction of the secondary air flow.

According to another embodiment of the invention, at least one of the electrical energy generation devices is mounted radially on the nacelle relative to the longitudinal axis of the turbomachine.

According to a particular feature of the invention, the electrical energy generation devices mounted radially on the nacelle are placed between the support arms or upstream of the support arms relative to the secondary air flow.

According to another particular feature of the invention, the nacelle comprises at least one cavity in which is mounted one of the electrical energy generation devices.

This allows limiting the perturbations of the air flow in the secondary duct. This can, for example be the case during the generation of a strong thrust.

According to a particular feature of the invention, a cavity of the nacelle comprises a retractable hatch.

The retractable hatch allows blocking or not blocking the access of the secondary air flow to the electrical energy generation device, and thus preserving an effective flow when there is no need to generate electricity from said devices. This allows improving the operation of the engine, because energy needs differ depending on the phases of flight: takeoff, landing or cruise.

According to another particular feature of the invention, the cavities of the nacelle are NACA air inlets.

Another object of the invention relates to an aircraft comprising at least one turbomachine according to the invention.

BRIEF DESCRIPTION OF THE DRAWINGS

Other features and advantages of the present invention will be revealed by the description given below, with reference to the appended drawings which illustrate exemplary embodiments of it bereft of any limiting character.

FIG. 1A shows schematically and partially a view of a turbomachine according to one embodiment of the invention.

FIG. 1B shows schematically and partially a detailed view of the turbomachine of FIG. 1A.

FIG. 2 shows schematically and partially a view of a turbomachine according to another embodiment of the invention.

FIG. 3A shows schematically and partially a view of a turbomachine according to another embodiment of the invention.

FIG. 3B shows schematically and partially a detailed view of the turbomachine of FIG. 3A.

FIG. 4A shows schematically and partially a view of a turbomachine according to another embodiment of the invention.

FIG. 4B shows schematically and partially a detailed view of the turbomachine of FIG. 4A.

DESCRIPTION OF THE EMBODIMENTS

FIGS. 1A and 1B show schematically and partially a turbomachine 100 according to a first embodiment of the invention, FIG. 1B being a detailed view of FIG. 1A.

The turbomachine 100 comprises a gas turbine engine 110, a fan 120 arranged on a longitudinal axis X of the turbomachine 100, an annular nacelle 160 surrounding the engine 110 and the fan 120, a primary duct 130 able to channel a primary air flow from the fan 120 and a secondary duct 140 delimited by the nacelle 160 able to channel a secondary air flow from the fan 120 having a temperature lower than that of the primary flow. The secondary air flow extends around the primary air flow.

The turbomachine 100 also comprises support arms 150 arranged around the longitudinal axis X of the turbomachine 100 between the nacelle 160 and a hub which delimits the primary and secondary ducts.

In conformity with the invention, the turbomachine 100 comprises an electrical energy generation device 171, 172, 173, 174, more particularly in this embodiment the turbomachine 100 comprises several of them. These electrical energy generation devices are mounted in the secondary air flow and are driven by this air flow. More precisely, the electrical energy generation devices 171 to 174 are mounted facing the support arms 150, on supports arranged around the longitudinal axis X of the turbomachine 100 between the support arms 150. The supports can also be arranged at the same level as the support arms 150 or upstream or downstream of the support arms 150 relative to the direction of the secondary air flow. This allows in particular being able to use the entire flow of air passing in the secondary duct 140.

In addition, the electrical energy generation devices 171 to 174 can be arranged facing the secondary air flow, which is shown in FIG. 1B, or in the direction of the secondary air flow.

FIG. 2 shows schematically and partially a turbomachine 200 according to a second embodiment of the invention.

The turbomachine 200 comprises a gas turbine engine 210, a fan 220 arranged along a longitudinal axis X of the turbomachine 200, an annular nacelle, not shown in FIG. 2, surrounding the fan 220, a primary duct 230 able to channel a primary air flow from the fan 220 and a secondary duct 140 delimited by the nacelle 260 able to channel a secondary air flow from the fan 220 having a temperature lower than that of the primary flow. The secondary air flow extends around the primary air flow.

The turbomachine 200 also comprises support arms 250, 251 arranged around the longitudinal axis X of the turbomachine 200 between the nacelle 260 and a hub which delimits the primary and secondary ducts.

The turbomachine 200 comprises several electrical energy generation devices 271, 272, 273, 274. These electrical energy generation devices are mounted in the secondary air flow and are driven by this air flow. More precisely, the electrical energy generation devices 271 to 273 are mounted on the support arm 250 and the electrical energy generation device 274 on the support arm 251. This allows in particular not impeding the flow of air passing in the secondary duct 240.

In addition, the electrical energy generation devices 271 to 274 can be arranged facing the secondary air flow or in the direction of the secondary air flow, which is shown in FIG. 2.

FIGS. 3A and 3B show schematically and partially a turbomachine 300 according to a third embodiment of the invention, FIG. 3B being a detailed view of FIG. 3A.

The turbomachine 300 comprises a gas turbine engine 310, a fan 320 arranged along a longitudinal axis X of the turbomachine 300, an annular nacelle 360 surrounding the engine 310, a primary duct 330 able to channel a primary air flow from the fan 320 and a secondary duct 340 delimited by the nacelle 360 able to channel a flow of secondary air from the fan 320 having a temperature lower than that of the primary flow. The secondary flow extends around the primary flow.

The turbomachine 300 also comprises support arms 350 arranged around the longitudinal axis X of the turbomachine 300 between the nacelle 360 and a hub delimiting the primary and secondary ducts.

The turbomachine 300 comprises a plurality of electrical energy generating devices 371, 372, 373, 374, 375 mounted in the secondary air flow and driven by the same air flow. The electrical energy devices 371 to 375 are mounted on the nacelle 360 radially relative to the longitudinal axis X of the turbomachine 300.

The electrical energy generation devices can be placed in the nacelle 360 upstream of the support arms 350, i.e. between the fan 320 and the support arms 350 like the device 375, or ahead of the support arms 350, or at the same level as the support arms like the device 374.

In order to limit the perturbation of the air flow in the secondary duct 340, it is possible to provide for radial retraction of the electrical energy generation devices. Radial retraction is for example of the mechanical or hydraulic type. Thus the electrical energy generation devices can be arranged facing the support arms or else they can be retracted.

FIGS. 4A and 4B show schematically and partially a turbomachine 400 according to a fourth embodiment of the invention, FIG. 4B being a detailed view of FIG. 4A.

As in the preceding embodiments, the turbomachine 400 comprises a gas turbine engine 410, a fan 420 arranged along a longitudinal axis X of the turbomachine 400, an annular nacelle 460 surrounding the engine 110, a primary duct 430 able to channel a primary air flow from the fan 420 and a secondary duct 140 delimited by the nacelle 460 able to channel a secondary air flow from the fan 420 having a temperature lower than that of the primary flow. It also comprises support arms 450 arranged around the longitudinal axis X of the turbomachine 100 between the nacelle 460 and a hub delimiting the primary and secondary ducts.

The turbomachine 400 comprises at least two electrical energy generation devices 471 and 472 mounted in the secondary air flow and driven by the same air flow. The electrical energy devices 471 and 472 are mounted on the nacelle 460 radially relative to the longitudinal axis X of the turbomachine 400. More precisely, the nacelle 460 comprises cavities 470 in which are located at least one electrical energy generation device 471. The cavity 470 can comprise a removable hatch 461 so as to close or open the cavity 470 depending on the need for electrical energy. Thus, in the case where there is no need to produce electrical energy, the cavity 470 can be closed due to the hatch 461 so that the electrical energy device 471 does not perturb the secondary air flow.

The cavity 470 can also be a NACA type air inlet. A NACA type air inlet is a fluid intake the geometry of which is optimized to limit head losses and wake to the maximum extent. The inlet has, for example, a ramp with a shallow slope with walls that are curved toward the interior of the surface exposed to the fluid, thus exposed here to the secondary air flow. This allows increasing the air flow collected by the electrical energy generation device present in this cavity 470 while perturbing as little as possible the boundary layer at the surface of the nacelle.

Regardless of the embodiment, the electrical energy generation devices can be fans or impellers. For example, in the case of electrical energy generation devices placed radially relative to the longitudinal axis X of the turbomachine, the devices can be impellers. In the case of electrical energy generation devices placed axially relative to the longitudinal axis X of the turbomachine, the devices can be fans.

Regardless of the embodiment, it is possible to vary the placement of the electrical energy generation devices on the turbomachine, thus the turbomachine can comprise these devices radially on the nacelle and/or on the engine support arms and/or on supports arranged around the longitudinal axis of the turbomachine between the engine support arms.

Regardless of the embodiment, it is also possible to place electrical energy generation devices over the entire length of the annular nacelle in columns and/or on lines. In addition, the devices can also be arranged staggered relative to one another.

The invention claimed is:

1. A turbomachine comprising:
   a fan arranged along a longitudinal axis of the turbomachine,
   a primary duct able to channel a flow of primary air from the fan through a compressor, a combustion chamber and a turbine of the turbomachine,
   an annular nacelle surrounding the fan so as to delimit a secondary duct able to channel a flow of secondary air from the fan, a temperature of which is less than that of the primary air from the fan, the secondary air flow of the fan extending around the primary air flow of the fan, and
   at least one support arm arranged around the longitudinal axis (X) between the annular nacelle and a hub which delimits the primary and secondary ducts, wherein the turbomachine also comprises at least one electrical energy generation device mounted on the at least one support arm and the at least one electrical energy generation device driven by the secondary air flow.

2. The turbomachine according to claim 1, wherein the at least one of the electrical energy generation devices is mounted on a support arranged around the longitudinal axis of the turbomachine between the at least one support arm.

3. The turbomachine according to claim 1, wherein the at least one electrical energy generation device is mounted on the at least one support arm or on a support arranged around the longitudinal axis of the turbomachine between two support arms of the at least one support arm.

4. The turbomachine according to claim 1, wherein at least one of the electrical energy generation devices is mounted retractably on the nacelle radially relative to the longitudinal axis of the turbomachine.

5. The turbomachine according to claim 4, wherein the electrical energy generation devices mounted radially on the nacelle are placed between the support arms or upstream of the support arms relative the secondary air flow.

6. The turbomachine according to claim 1, wherein the nacelle comprises at least one cavity wherein is mounted one of the electrical energy generation devices.

7. The turbomachine according to claim 6, wherein a cavity of the nacelle comprises a retractable hatch.

8. The turbomachine according to claim 6, wherein the cavities of the nacelle are NACA air inlets.

9. An aircraft comprising at least one turbomachine according to claim 1.

10. A turbomachine comprising:
    a fan arranged along a longitudinal axis of the turbomachine,
    a primary duct able to channel a flow of primary air from the fan through a compressor, a combustion chamber and a turbine of the turbomachine,
    an annular nacelle surrounding the fan so as to delimit a secondary duct able to channel a flow of secondary air from the fan, a temperature of which is less than that of the primary air from the fan, the secondary air flow of the fan extending around the primary air flow of the fan, and
    at least one support arm arranged around the longitudinal axis (X) between the annular nacelle and a hub which delimits the primary and secondary ducts, wherein the turbomachine also comprises at least one electrical energy generation device mounted on a support arranged around the longitudinal axis of the turbomachine between the at least one support arm and the at least one electrical energy generation device driven by the secondary air flow.

11. The turbomachine according to claim 10, wherein at least one of the electrical energy generation devices is mounted retractably on the nacelle radially relative to the longitudinal axis of the turbomachine.

12. The turbomachine according to claim 11, wherein the electrical energy generation devices mounted radially on the nacelle are placed between the support arms or upstream of the support arms relative the secondary air flow.

13. The turbomachine according to claim 12, wherein the nacelle comprises at least one cavity wherein is mounted one of the electrical energy generation devices.

14. The turbomachine according to claim 13, wherein a cavity of the nacelle comprises a retractable hatch.

15. The turbomachine according to claim 13, wherein the cavities of the nacelle are NACA air inlets.

16. An aircraft comprising at least one turbomachine according to claim 10.

17. A turbomachine comprising:
    a fan arranged along a longitudinal axis of the turbomachine, a primary duct able to channel a flow of primary air from the fan through a compressor, a combustion chamber and a turbine of the turbomachine, an annular nacelle surrounding the fan so as to delimit a secondary duct able to channel a flow of secondary air from the fan, a temperature of which is less than that of the primary air from the fan, the secondary air flow of the fan extending around the primary air flow of the fan, and at least one support arm arranged around the longitudinal axis (X) between the annular nacelle and a hub which delimits the primary and secondary ducts, wherein the turbomachine also comprises at least one electrical energy generation device mounted retractably on the nacelle radially relative to the longitudinal axis of the turbomachine, and the at least one electrical energy generation device is driven by the secondary air flow.

18. The turbomachine according to claim 17, wherein the electrical energy generation devices mounted radially on the nacelle are placed between the support arms or upstream of the support arms relative the secondary air flow.

19. The turbomachine according to claim 17, wherein the nacelle comprises at least one cavity wherein is mounted one of the electrical energy generation devices.

20. An aircraft comprising at least one turbomachine according to claim 17.

* * * * *